United States Patent

[11] 3,540,768

[72] Inventor Norman L. Peters
1502 N. Main St. Extension, Butler,
Pennsylvania 16001
[21] Appl. No. 729,614
[22] Filed May 16, 1968
[45] Patented Nov. 17, 1970

[54] SPRING MOUNTED RESILIENTLY COVERED BUMPER
4 Claims, 4 Drawing Figs.

[52] U.S. Cl. .................................................... 293/89,
293/62, 293/63, 293/91, 293/96
[51] Int. Cl. .................................................... B60r 19/06,
B60r 21/14, B61f 19/04
[50] Field of Search ............................................ 293/85, 86,
63, 89, 90, 91, 92, 93, 94, 96, 62, 70, 71

[56] References Cited
UNITED STATES PATENTS

| | | | | |
|---|---|---|---|---|
| 2,068,846 | 1/1937 | Critani | | 293/71 |
| 2,168,908 | 8/1939 | Lewis | | 293/62 |
| 2,186,505 | 1/1940 | Tibbetts | | 293/62 |
| 2,207,895 | 7/1940 | Rauen | | 293/62 |
| 2,330,684 | 9/1943 | Colling | | 293/71X |
| 2,541,364 | 2/1951 | Jurasevich | | 293/62 |
| 1,455,644 | 5/1923 | Martin | | 293/89 |
| 1,548,087 | 8/1925 | Heller | | 293/85 |
| 1,552,221 | 9/1925 | Mialkowski | | 293/89X |
| 1,570,526 | 1/1926 | Robinson | | 293/92 |
| 1,668,811 | 5/1928 | Jones | | 293/89 |
| 1,687,880 | 10/1928 | Myers | | 293/92X |
| 1,855,977 | 4/1932 | Llobet | | 293/89X |
| 2,903,289 | 9/1959 | Klix | | 293/89X |
| 3,363,934 | 1/1968 | Peters | | 296/28 |

*Primary Examiner*—Arthur L. LaPoint
*Assistant Examiner*—Howard Beltran
*Attorney*—Murray and Linkhauser

ABSTRACT: Described is a vehicle bumper construction, particularly adapted for use at the rear of a semitrailer, incorporating a horizontal bar member having an external portion of rubber or other resilient material joined to a strength-imparting core which may, for example, be formed from steel tubing.

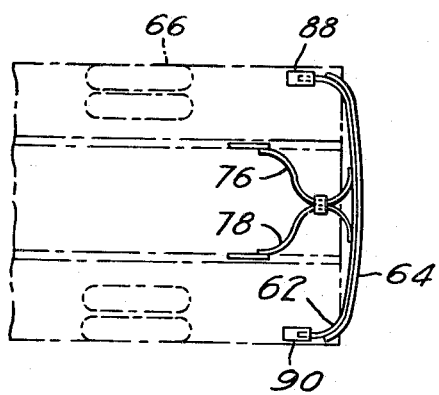
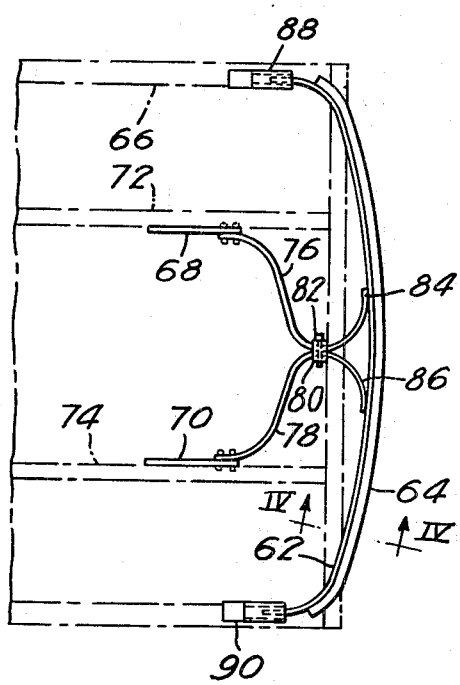
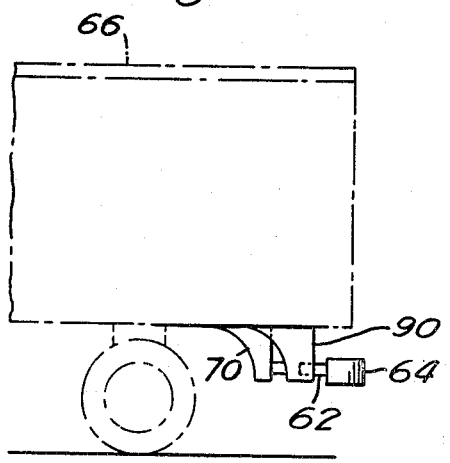
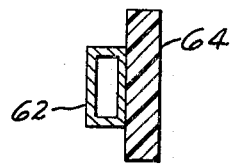
INVENTOR
NORMAN L. PETERS
BY Murray & Laihlauer
ATTORNEYS

SPRING MOUNTED RESILIENTLY COVERED BUMPER

BACKGROUND OF THE INVENTION

As will be appreciated, accidents often occur wherein the driver of a passenger automobile, having fallen asleep or due to inadvertence, rams into the rear of a semitrailer. This problem is aggravated by the fact that trailer trucks, particularly on grades and hills, travel at a lower rate of speed than an approaching automobile from the rear. Furthermore, in most cases, the body of the trailer is far above the front bumper of the approaching automobile, with the result that the automobile passes underneath the floor of the trailer, causing severe damage and injury to the occupants of the automobile. Rigid bars depending downwardly from the truck body have been provided in the past; however these do nothing to cushion the impact of an approaching automobile and, in certain cases, aggravate the damage resulting from a collision.

SUMMARY OF THE INVENTION

As an overall object, the present invention seeks to provide a new and improved bumper construction, particularly adapted for use at the rear of semitrailers, which cushions the impact of a vehicle from the rear and lessens the possibility of an approaching vehicle from passing under the trailer in the event of a collision.

Another object of the invention is to provide a bumper construction of the type described comprising a tubular cross-member having an outer covering of rubber or other resilient material and supported on leaf springs at the rear of a semitrailer at a height where it will engage a protective safety bar of an approaching passenger automobile.

In accordance with the invention, a bumper construction is provided comprising a generally horizontal bar member and, exteriorly thereof, a strip member of resilient material joined thereto, the bar member acting to cushion an impact of an approaching vehicle. The bar member is carried at the rear of a semitrailer, for example, beneath the floor thereof and at a height which preferably coincides with the height of the safety bar for a conventional passenger automobile shown in U.S. Pat. No. 3,363,934, issued Jan. 16, 1968. This height will usually be about 30 inches. The center portion of the bar member is supported on leaf springs secured to the frame of the semitrailer; while the opposite ends of the bar member are free to slide within sleeves extending downwardly from the semitrailer frame. In this manner, it will be appreciated that the leaf springs cushion the impact of an approaching automobile; while the ends of the bar member, being free to reciprocate, can act to deflect the automobile from the trailer.

The above and other objects and features of the invention will become apparent from the following detailed description taken in connection with the accompanying drawings which form a part of this specification, and in which:

FIG. 1 is a top view of the bumper construction of the present invention;

FIG. 2 is a side view of the bumper arrangement shown in FIG. 1;

FIG. 3 is an enlarged, detailed top view of the bumper of FIG. 1; and

FIG. 4 is a cross-sectional view of the bumper of the invention taken substantially along line IV-IV of FIG. 3. 3,363,934)

With reference now to the drawings, and particularly to FIG. 1, a tubular bar 62, provided with an outer rubber or other wise resilient strip member 64, is utilized as a bumper for the trailing end of a semitrailer, schematically illustrated at 66. The bar 62 covered with resilient strip 64 is spring mounted beneath the body of the truck, approximately at the height of a safety bar (U.S. Pat. No. 3,363,934) of an automobile approaching from the rear. As will be seen by reference to the aforesaid U.S. Pat. No. 3,363,934, the safety bar comprises a member which extends about the periphery of at least the front half of the automobile and is designed to deflect another automobile in the event of a collision rather than attempt to absorb energy by collapsing the automobile structure. As best shown in FIG. 3, two plates 68 and 70 are welded, bolted or otherwise securely fastened to body members 72 and 74 of the trailer 66 and depend downwardly as perhaps best shown in FIG. 2. Secured to the lower extremities of the plates 68 and 70 are two generally C-shaped leaf springs 76 and 78. The two springs 76 and 78 abut as at 80 to provide a wishbone configuration and are provided with a collar 82 having a bolt which passes through slotted openings in the springs 76 and 78 to permit relative movement between the two. The opposite ends of the springs 76 and 78 are welded or otherwise fastened to the tubular bar 62 as at 84 and 86.

The resilient strip 64 does not extend along the entire length of the bar member 62. Rather, the ends of the bar are bare and are bent inwardly such that the bar assumes a generally U-shape. These ends are then free to slide within sleeves 88 and 90 also secured to the truck body and depending downwardly therefrom. The sides of the sleeves can be moved inwardly or outwardly, as by means of bolts, to vary the resistance to sliding encountered within the sleeves.

With the arrangement shown, the springs 76 and 78 will compress under the force of an impact, thereby cushioning the impact and substantially reducing the possibility of damage due to a rear end collision. Furthermore, the bar 62, since its height coincides with the safety bar of the aforesaid U.S. Pat. No. 3,363,934, will prevent or at least impede the automobile from passing under the trailer itself. In most cases, if a collision occurs, the approaching automobile will not strike the bar 62 at the dead center thereof. Rather, it will strike either to the left or right of the springs 76 and 78. The sleeve arrangement at the opposite ends of the bumper enables the bumper to deflect, thereby serving as a means to also deflect, or at least partially deflect, an approaching automobile. While the bar 62 and strip 64 project outwardly beyond the end of the truck body, the springs 76 and 78 will compress when, for example, the truck is backed up against a loading dock.

The cross section of the tubular bar 62 and resilient strip 64 is shown in FIG. 4. Note that the bar 62 is preferably rectangular with the strip 64 secured thereto, as by an epoxy resin.

Although the invention has been shown in connection with a certain specific embodiment, it will be readily apparent to those skilled in the art that various changes in forms and arrangement of parts may be made to suit requirements without departing from the spirit and scope of the invention.

I claim:

1. A bumper for vehicles comprising a generally horizontal bar member fixed at its center only to leaf spring means securable to the chassis of said vehicle beneath the floor of the vehicle, said leaf spring means permitting the bar member to move inwardly when the bar member is impacted by an approaching vehicle and to deflect an impacting vehicle when the impact is on either side of said center, and sleeve members carried on said vehicle beneath the floor thereof and spaced from the center connection of said leaf spring means to said bar member and within which the ends of said bar member reciprocably slide.

2. The bumper of claim 1, wherein said leaf spring means are generally curvilinear in configuration and abut each other, the ends of said bar member being curved inwardly for reciprocation within said sleeve members.

3. The bumper of claim 1, including a strip member of resilient material joined to the outer surface of said bar member.

4. The bumper of claim 2, including a collar securing together the abutting surfaces of said curvilinear leaf spring means, slotted openings in said leaf spring means, and a bolt passing through said collar and slotted openings in said leaf spring means.